UNITED STATES PATENT OFFICE.

WILLIAM ROY MOTT, OF LAKEWOOD, OHIO, ASSIGNOR TO NATIONAL CARBON COMPANY, INC., A CORPORATION OF NEW YORK.

PROCESS OF PURIFYING LAMPBLACK AND MAKING CARBON ARTICLES.

1,303,362.

Specification of Letters Patent.   Patented May 13, 1919.

No Drawing.   Application filed November 1, 1917.  Serial No. 199,631.

*To all whom it may concern:*

Be it known that I, WILLIAM ROY MOTT, a citizen of the United States, residing at Lakewood, in the county of Cuyahoga and State of Ohio, have invented a certain new and useful Improvement in Processes of Purifying Lampblack and Making Carbon Articles, of which the following is a full, clear, and exact description.

This invention relates to the purification of lampblack and articles made therefrom, as well as from other kinds of carbon, and is a continuation in part of my copending case filed June 24, 1916, Serial No. 105,685. Lampblack, when produced by certain known processes, has too high a percentage of impurities to be used directly in certain of arts, particularly in the manufacture of arc lamp industry. printing ink and in the arc lamp industry. The most common impurities are the oxids of iron and silica, and to free lampblack of these and other substances, I propose to heat it with carbon tetrachlorid or with chlorin and natural gas, which will produce carbon tetrachlorid.

As a specific application of the invention, I will describe it in connection with the calcination of lampblack to be used in the carbon industry, such as in the making of arc lamp electrodes, brushes for dynamo electric machines, etc. For the manufacture of these articles it is generally the practice to mix pitch or tar with lampblack and compact it into cakes which are then calcined to 800° to 1000° C. to drive off the volatile constituents. To adapt the invention to this procedure, I would mix carbon tetrachlorid with the lampblack, either with or without pitch, tar or other binding material, and when the cakes are calcined the carbon tetrachlorid will react with the impurities in the lampblack, such as the oxids of silicon, iron, etc., in accordance with the following equations:—

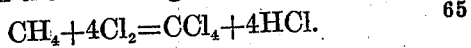
$$SiO_2 + CCl_4 = SiCl_4 + CO_2.$$
$$2Fe_2O_3 + 3CCl_4 = 4FeCl_3 + 3CO_2.$$

The carbon tetrachlorid reacts on the oxids mentioned to produce the chlorids of the respective metals which at the temperature of calcination of the lampblack would be driven off to escape through the furnace flue.

Instead of mixing carbon tetrachlorid with the lampblack in liquid form, it may be passed into the calcining furnace in a vapor form where the reaction would proceed in a similar way.

Also chlorin and natural gas may be mixed together and passed into the calcining chamber where the heat would cause the interaction for the production of carbon tetrachlorid and hydrochloric acid in accordance with the following reaction:—

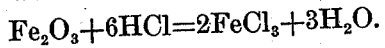
$$CH_4 + 4Cl_2 = CCl_4 + 4HCl.$$

The carbon tetrachlorid would then act on the impurities and the hydrochloric acid formed would coöperate in this respect, particularly as regards the iron oxid. This reaction would be as follows:—

$$Fe_2O_3 + 6HCl = 2FeCl_3 + 3H_2O.$$

It will thus be seen that the combination of chlorin and natural gas makes an especially suitable reagent for the purpose mentioned.

It is not required that the chlorin compound be carbon tetrachlorid, as any hydrocarbon previously reacted on by chlorin can be used to accomplish the same purpose. For instance, I may pass chlorin gas into solutions, preferably heated, of hydrocarbons such as tar, mineral oils, pitch, kerosene, etc., and use these as binders for the lampblack or other carbon to be purified. The binder may be either a temporary one as in the calcination of bulk lampblack, or it may be a permanent one as in formed carbon articles such as brushes, arc lamp electrodes, etc. When the carbon containing the chlorinated compound is heated in the process of calcination, the latter reacts on the impurities in much the same way as carbon tetrachlorid. In fact, the chlorinated compounds may be converted into carbon tetrachlorid during the calcination, but this is a matter that would be difficult to determine. At any rate, impurities can be removed from carbon by calcining it with hydrocarbons that have been impregnated with chlorin.

My process of the purification of carbon is not limited to lampblack in its application, as any carbon or graphite can be purified by the same process. It is well known that various cokes used in the carbon industry and other arts possess a more or less high percentage of impurities, such as oxids and compounds of silicon, iron, manganese, etc.

The coke or other carbon product can be treated in the calcining furnaces in the same way as has just been described.

The invention is also applicable to the purification of carbon articles that have been formed into the desired shape, such as arc lamp electrodes, brushes for dynamo electric machines, switch contacts, etc. The carbon tetrachlorid could be mixed with the binder that is used to hold the particles together, or it may be introduced in gaseous or vapor form into the furnace to react on the impurities in the formed article by passing directly into the pores thereof.

The carbon articles can also be baked in a furnace in an atmosphere of natural gas and chlorin. The carbon tetrachlorid would react with the impurities and the natural gas would at the same time react with the latter to deposit carbon in the pores of the carbon article. In this way the article would be purified and made more dense by the deposit of pure carbon in the pores and voids.

Having described my invention, what I claim is:—

1. The process of purifying carbon which consists in heating it in the presence of carbon tetrachlorid at such a temperature as to drive off the products resulting from the reaction between the carbon tetrachlorid and the impurities.

2. The process of purifying carbon, which consists in calcining it with a chlorinated hydrocarbon compound.

3. The process of making a carbon article which consists in forming it into shape with a binder consisting of a chlorinated hydrocarbon and calcining it to set the binder.

In testimony whereof, I hereunto affix my signature.

WM. ROY MOTT.